(12) United States Patent
Tillotson

(10) Patent No.: US 11,828,771 B2
(45) Date of Patent: Nov. 28, 2023

(54) METHOD AND SYSTEM FOR COLLECTING AIR DATA USING A LASER-INDUCED PLASMA CHANNEL

(71) Applicant: THE BOEING COMPANY, Chicago, IL (US)

(72) Inventor: Brian Tillotson, Tukwila, WA (US)

(73) Assignee: The Boeing Company, Arlington, VA (US)

( * ) Notice: Subject to any disclaimer, the term of this patent is extended or adjusted under 35 U.S.C. 154(b) by 1122 days.

(21) Appl. No.: 16/511,342

(22) Filed: Jul. 15, 2019

(65) Prior Publication Data

US 2021/0018529 A1 Jan. 21, 2021

(51) Int. Cl.
*G01P 5/26* (2006.01)
*G01C 23/00* (2006.01)
*G01F 1/7086* (2022.01)

(52) U.S. Cl.
CPC ............. *G01P 5/26* (2013.01); *G01C 23/00* (2013.01); *G01F 1/7086* (2013.01)

(58) Field of Classification Search
CPC ........ G01P 5/083; G01P 13/025; G01F 1/588; G01F 1/60
See application file for complete search history.

(56) References Cited

U.S. PATENT DOCUMENTS

| 8,072,584 | B2 | 12/2011 | Caldwell et al. | |
|---|---|---|---|---|
| 9,038,453 | B2 * | 5/2015 | Paris | G01P 5/18 73/170.02 |
| 9,383,447 | B2 | 7/2016 | Schmitt et al. | |
| 2009/0122314 | A1 * | 5/2009 | Danehy | G01N 21/474 356/337 |
| 2013/0094012 | A1 * | 4/2013 | Peuser | G01F 1/661 356/28 |
| 2014/0331760 | A1 * | 11/2014 | Paris | G01P 5/18 73/170.02 |
| 2018/0088238 | A1 * | 3/2018 | Garde | G01S 17/88 |

FOREIGN PATENT DOCUMENTS

| CN | 109444458 A | * | 3/2019 | ............... G01P 5/26 |
|---|---|---|---|---|
| CN | 109444458 A | | 3/2019 | |
| RU | 2006141617 A | | 5/2008 | |

OTHER PUBLICATIONS

European Extended Search Report issued in European Patent Application No. 20184952.8 dated Dec. 22, 2020; pp. 1-9.

* cited by examiner

*Primary Examiner* — Luke D Ratcliffe
(74) *Attorney, Agent, or Firm* — Armstrong Teasdale LLP

(57) ABSTRACT

A method of measuring air data of an aircraft is provided. The method includes emitting, by a laser disposed on the aircraft, laser light into air outside the aircraft, the laser tuned to induce a laser-induced plasma channel (LIPC) in the air. The method also includes sensing, by a sensor system disposed on the aircraft, at least one property of the LIPC. The method further includes computing, by a computing device disposed on the aircraft, the air data of the aircraft based on the at least one property of the LIPC.

25 Claims, 7 Drawing Sheets

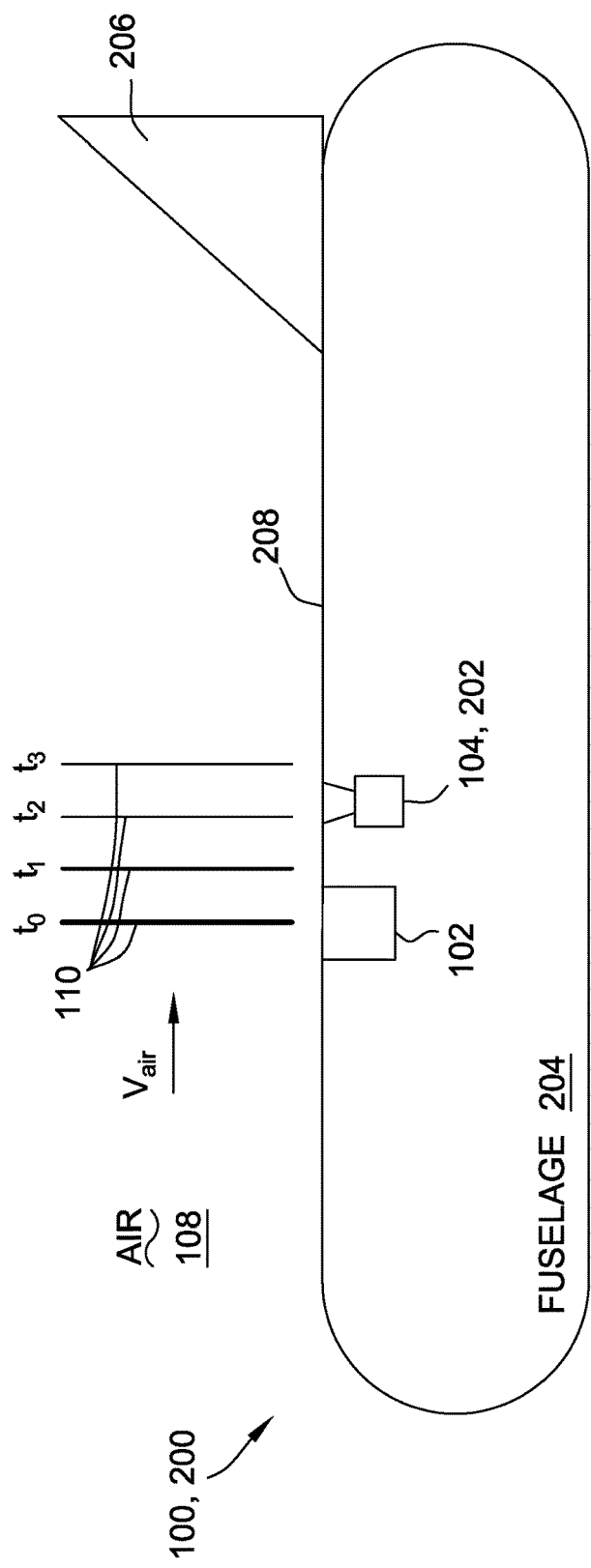
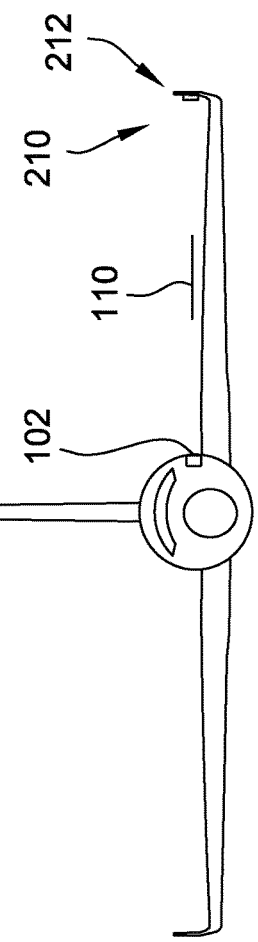
FIG. 2A
FIG. 2B

METHOD AND SYSTEM FOR COLLECTING AIR DATA USING A LASER-INDUCED PLASMA CHANNEL

FIELD

The field of the disclosure relates generally to air data systems and, more specifically, to a system and method for measuring air data of an aircraft using a laser-induced plasma channel.

BACKGROUND

To measure air data of an aircraft such as airspeed and air density, a static pressure instrument such as a pitot tube is typically used. A reliability of such instruments depends upon maintaining an open air channel, which may be susceptible to icing, insects, bird strikes, or the like. In addition, a pitot tube is difficult to use at hypersonic speed because of heating and shockwave formation. Known alternatives to a pitot tube include light detection and ranging (LIDAR) systems, in which a laser is used to measure distance to a target by illuminating the target with pulsed laser light and sensing the laser pulses reflected by the target. The target used in LIDAR for the purpose of measuring air data is air molecules or airborne particulates. However, particulates are scarce above 30,000 feet where supersonic or hypersonic aircraft typically operate. Further, LIDAR requires relatively large, heavy, and expensive lasers to emit laser light sufficiently strong for detection after reflection, particularly as altitude increases and air density correspondingly decreases. Accordingly, an alternative system to a pitot tube for measuring air data, a system that is smaller, lighter, and/or less expensive than a LIDAR system, would find utility.

BRIEF DESCRIPTION

One aspect of the present disclosure includes a method of measuring air data of an aircraft. The method includes emitting, by a laser disposed on the aircraft, laser light into air outside the aircraft, the laser tuned to induce a laser-induced plasma channel (LIPC) in the air. The method also includes sensing, by a sensor system disposed on the aircraft, at least one property of the LIPC. The method further includes computing, by a computing device disposed on the aircraft, the air data of the aircraft based on the at least one property of the LIPC.

Another aspect of the present disclosure includes an air data system for measuring air data of an aircraft. The air data system includes a laser, a sensor system, and a computing device. The laser is disposed on the aircraft. The sensor system is also disposed on the aircraft. The computing device is disposed on the aircraft, and includes at least one processor in electronic communication with the laser and the sensor system. The at least one processor is configured to cause the laser to emit laser light into air outside the aircraft, the laser being tuned to induce an LIPC in the air. The at least one processor is also configured to receive, from the sensor system, at least one property of the LIPC detected by the sensor system and compute the air data of the aircraft based on the at least one property of the LIPC.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF THE DRAWINGS

FIG. 2A is a schematic side elevation view of an aircraft including an example implementation of the air data system of FIG. 1;

FIG. 2B is a schematic front elevation view of an aircraft including another implementation of the air data system of FIG. 1;

Figure 1:
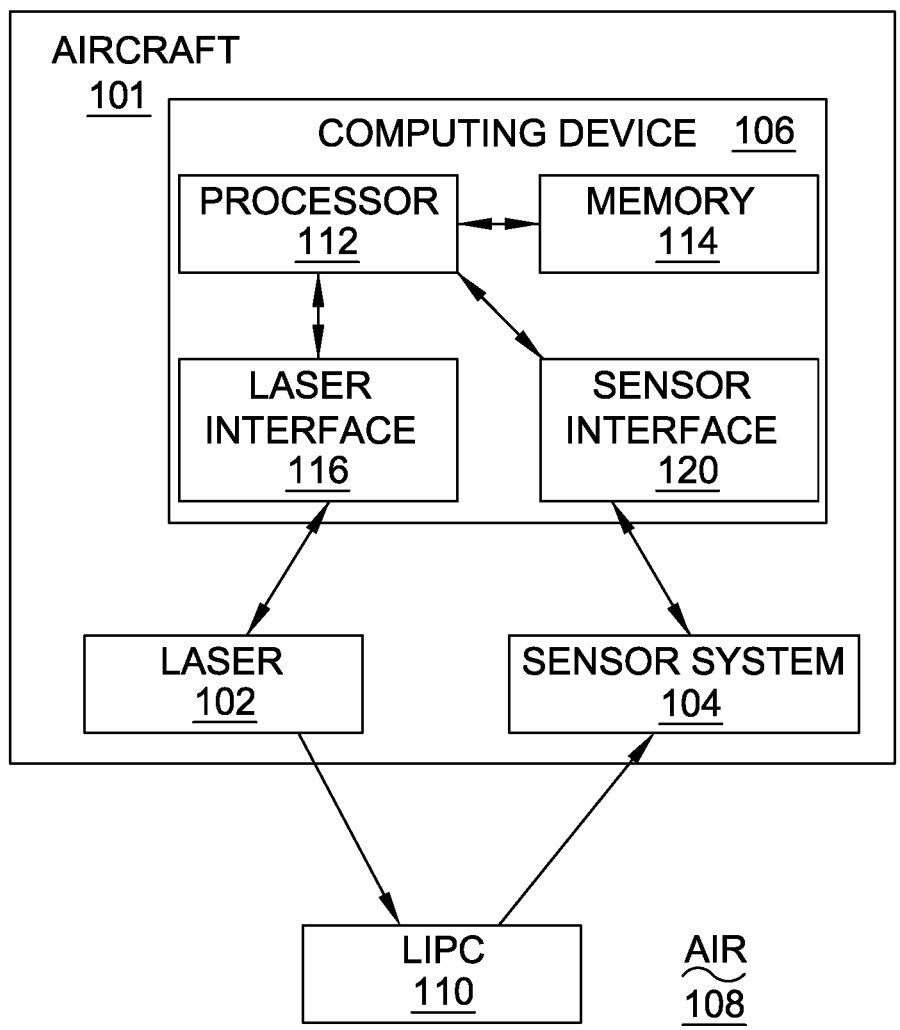
FIG. 1 is a schematic block diagram of an example air data system implemented on an aircraft.

Although specific features of various examples may be shown in some drawings and not in others, this is for convenience only. Any feature of any drawing may be referenced and/or claimed in combination with any feature of any other drawing.

Unless otherwise indicated, the drawings provided herein are meant to illustrate features of examples of the disclosure. These features are believed to be applicable in a wide variety of systems comprising one or more examples of the disclosure. As such, the drawings are not meant to include all conventional features known by those of ordinary skill in the art to be required for the practice of the examples disclosed herein.

DETAILED DESCRIPTION

Examples of the systems and methods described herein include an air data system. The air data system includes a laser, a sensor system, and a computing device. The computing device is configured to cause the laser to emit laser light into air outside the aircraft, the laser being tuned to induce a laser-induced plasma channel (LIPC) in the air. The LIPC is not a reflection of the emitted laser light, but rather the emitted laser light is absorbed by the air, converting a portion of the air into a plasma. The plasma then emits radiation in characteristic visible and near-visible wavelengths (generally independent of the wavelength of the inducing laser) and is electrically conductive. The laser energy required to generate the LIPC is much less than the laser energy that would be required to generate a detectable reflection of the laser light itself from air molecules or particulates, particularly at high altitudes. Thus, the systems and methods described herein may be implemented with lasers that are relatively smaller, lighter, and/or less expensive than those required to implement a LIDAR system on an aircraft.

In some examples, the air data includes an air speed. The sensor system captures a shift in a location of the LIPC relative to the aircraft over a known time interval, and the computer system calculates the air speed based on the shift in location and the time interval. Additionally or alternatively, the air data includes an air density, and the computer system calculates the air density based on an intensity of the visible or near-visible emitted radiation from the LIPC, or based on an intensity of radar signals emitted from the sensor system and reflected from the electrically conductive LIPC.

In some implementations, the sensor system of the air data system includes a camera. The camera takes images of the LIPC (i.e., the radiation emitted from the plasma in the LIPC) at different times. The images are used to measure air data of the air craft, including airspeed of the aircraft and/or air density outside the aircraft. Additionally or alternatively, the sensor system includes a radar. The radar waves emitted from the radar are reflected by the LIPC. The reflected radar waves are sensed by the radar and used to measure air data of the aircraft, such as airspeed and air density. In certain implementations, the air data system includes a plurality of sensor systems. Signals acquired by the plurality of sensor systems may be used to measure a three-dimensional (3-D) orientation of the aircraft, such as an angle of attack and/or an angle of sideslip of the aircraft.

FIG. 1 is a schematic block diagram of an example of an air data system 100 for measuring air data implemented on an aircraft 101. Air data may include at least one of an airspeed of aircraft 101 and an air density of ambient air outside aircraft 101. Air data system 100 includes a laser 102, a sensor system 104, and a computing device 106. Laser 102 and sensor system 104 are disposed on aircraft 101. Computing device 106 may be disposed on aircraft 101 or remotely from aircraft 101.

Laser 102 is configured to emit laser light toward air 108 outside aircraft 101 that flows past aircraft 101. More specifically, laser 102 is tuned to induce an LIPC 110 in air 108. LIPC 110 typically exists for less than one second, glows in a visible and/or near-visible wavelength range that depends on properties of the air molecules and/or any particulates in the air, and also reflects radar signals. In some examples, laser 102 is a short-pulse laser capable of creating LIPC 110 in air 108, is sufficiently small to fit on a tabletop, and/or weighs less than 30 pounds. Laser 102 may be implemented by a commercial, off-the-shelf laser with a pulse duration of a few tens of femtoseconds. Such lasers are capable of inducing LIPC in air at hypersonic speed, even at 1000 meters per second, as air travels less than one nanometer in the duration of a laser pulse. Although a single laser 102 is illustrated, in some examples, air data system 100 includes more than one laser 102. This improves reliability, enables a finer-grained measurement of air data, and may facilitate additional measurements. For example, if a first laser 102 is on the left side of aircraft 101 and a second laser 102 on the right side of aircraft 101, a difference in airspeeds measured from the corresponding induced LIPC 110 on both sides of aircraft 101 enables a calculation of a turn rate of aircraft 101.

In the example illustrated in FIG. 2A, laser 102 is positioned on aircraft 101 to emit laser light upward, which facilitates avoiding directing the laser light toward another object. Alternatively, laser 102 may be positioned to emit laser light in any suitable direction. For example, in the example illustrated in FIG. 2B, laser 102 is positioned to emit the laser light laterally at a laser beam trap 210 installed on a wing tip 212 of aircraft 101. Alternatively, laser beam trap 210 is installed in any suitable location on aircraft 101, or is not included. Laser beam trap 210 is configured to absorb any portion of the laser light that travels beyond the induced LIPC 110. In some examples, laser beam trap 210 includes a laser-absorbing surface such that laser light emitted by laser 102 does not travel beyond the extent of aircraft 101.

Aircraft 101 may include other safety mechanisms associated with laser 102. In certain examples, computing device 106 is programmed to automatically deactivate laser 102, such as by turning off a power supply of laser 102 or by another suitable mechanism, in response to the landing gear of aircraft 101 being in contact with the ground. In some examples, laser 102 is operated at a wavelength that prevents emitted laser light from propagating more than a few meters through air.

Sensor system 104 is configured to sense a property of LIPC 110, such as a position of LIPC 110 relative to sensor system 104, or an intensity or brightness of LIPC 110. Sensor system 104, for example, includes a camera 202 (shown in FIG. 2A) or a radar transmitter and receiver (collectively referred to as radar 302 herein) (shown in FIG. 3). Additionally or alternatively, sensor system 104 includes other sensors that can be used to sense a property of LIPC 110 and enable air data system 100 to function as described herein. Sensor system 104 is positioned at a location on aircraft 101 that enables sensor system 104 to detect signals from LIPC 110. That is, sensor system 104 is positioned such that signals emitted or reflected from LIPC 110 can reach sensor system 104. For example, if sensor system 104 includes camera 202, camera 202 is positioned such that LIPC 110 is within a field of view of the camera. If sensor system 104 includes radar 302, radar 302 is positioned such that radar waves emitted from radar 302 can reach LIPC 110 and be reflected back to radar 302.

Once induced, LIPC 110 remains stationary in air 108 while aircraft 101 continues to travel at airspeed. In some examples, the properties of LIPC 110 sensed by sensor system 104 after the induction of LIPC 110 are used to derive measurements of the movement of LIPC 110 relative to aircraft 101, i.e., movements of aircraft 101 relative to air 108. For example, a speed of LIPC 110 relative to aircraft 101 is the same as the airspeed of aircraft 101 and, therefore, the airspeed of aircraft 101 can be measured by measuring the speed of LIPC 110 relative to aircraft 101. The three-dimensional movement of aircraft 101 can also be measured by measuring movements and positions of LIPC 110 relative to aircraft 101, for example using two or more sensor systems 104.

Computing device 106 includes at least one processor 112 in communication with at least one memory 114. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above are examples only, and thus are not intended to limit in any way the definition or meaning of the terms processor, computing device, and related terms.

In the examples described herein, memory 114 may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

In the example, computing device 106 further includes a laser interface 116 and a sensor interface 120 each in electronic communication with processor 112. Laser interface 116 enables processor 112 to receive status and monitoring data from laser 102, and to communicate operator commands and pre-programmed (e.g., stored in computer-executable form in memory 114) commands to laser 102 that cause laser 102 to emit laser light at selected times and for selected durations, and to otherwise function as described herein. Sensor interface 120 enables processor 112 to receive status, sensed data, and monitoring data from sensor system 104, and to communicate operator commands and pre-programmed (e.g., stored in computer-executable form in memory 114) commands to sensor system 104 that cause sensor system 104 to capture data at selected times, and to otherwise function as described herein. Alternatively, computing device 106 interfaces with laser 102 and/or sensor system 104 in any suitable fashion that enables air data system 100 to function as described herein.

Also, in the examples described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the examples described herein, additional output channels may include, but not be limited to, an operator interface monitor.

In operation, computing device 106 is configured to control laser 102 and sensor system 104, receive signals indicative of properties of LIPC 110 from sensor system 104, and compute air data of aircraft 101 based on the signals. In the illustrated example, computing device 106 is implemented separately from a flight controller (not shown) of aircraft 101 and operable to receive and send commands, data, and other suitable signals from and to the flight controller of aircraft 101. Alternatively, computing device 106 is integrated with (e.g., processor 112 and/or memory 114 may be shared with) the flight controller of aircraft 101.

In the example, components of air data system 100 do not protrude beyond an outer skin contour of aircraft 101 into the airstream when aircraft 101 is in flight. Accordingly, air data system 100 is operable at hypersonic airspeeds without overheating and is less susceptible to damage during ground operations, compared to at least some known air data systems.

FIG. 2A is a schematic side elevation view of aircraft 101 showing an example implementation 200 of air data system 100. In implementation 200, sensor system 104 includes a camera 202 disposed on aircraft 101. Laser 102 is positioned adjacent to an outer skin 208 of aircraft 101 and configured to emit laser light toward air outside aircraft 101 to induce LIPC 110. In the example, laser 102 is positioned within a fuselage 204 of aircraft 101 and oriented to emit laser light upwards, as discussed above. Alternatively, laser 102 is positioned at any suitable location on aircraft 101, such as a wing (not shown) or vertical stabilizer 206 of aircraft 101, and is oriented to emit laser light in any suitable direction.

In implementation 200, camera 202 is positioned with respect to laser 102 such that LIPC 110 appears in a field of view of camera 202. In the example, camera 202 is positioned within fuselage 204 aft of laser 102 and oriented upwards to view LIPC 110 as aircraft 101 travels beneath LIPC 110. Alternatively, camera 202 is positioned at any suitable location on aircraft 101 relative to laser 102, such as a wing (not shown) or vertical stabilizer 206 of aircraft 101, and is oriented to in any suitable direction to view LIPC 110 during the short time window it remains visible after being induced.

In operation, air 108 flows past aircraft 101 at speed $V_{air}$. Processor 112 transmits a signal to laser 102 that causes laser 102 to fire a pulse at time $t_0$, creating LIPC 110 in air 108 flowing past aircraft 101. LIPC 110 contains a large population of ions and free electrons. For at least a few milliseconds, it glows brightly and also conducts electricity while moving with the airstream to subsequent positions relative to aircraft 101, illustrated at times $t_1$, $t_2$, and $t_3$. The narrowing of the lines used to illustrate LIPC 110 at subsequent times illustrates a gradual fade over time of an intensity of LIPC 110.

The visible radiation emitted by LIPC 110 enables it to be tracked by camera 202. Processor 112 transmits a signal to camera 202 that causes camera 202 to capture an image at at least one known time after $t_0$, for example, at times $t_1$, $t_2$, and $t_3$. Camera 202 sends the image data to computing device 106. Processor 112 of computing device 106 locates LIPC 110 in each image and uses image processing techniques to estimate the displacement of LIPC 110 through the camera's field of view over the known time interval and, therefore, the speed at which LIPC 110 is moving. This speed is airspeed $V_{air}$, of aircraft 101.

In some examples, processor 112 detects a first displacement of LIPC 110 between a first image of LIPC 110 captured at a first time point (e.g., $t_1$) and a second image of LIPC 110 captured at a second time point (e.g., $t_2$) and computes the airspeed by dividing the first displacement by the time interval between the first and second time points (e.g., $\Delta t = t_2 - t_1$). In other examples, the airspeed is calculated by averaging the results from a number of time intervals. For example, processor 112 further detects a second displacement of LIPC 110 between a third image of the LIPC captured at a third time point (e.g., $t_3$) and the second image of LIPC 110 captured at the second time point, divides the second displacement by the time interval between the second and third time points, and computes the airspeed by averaging the speed result obtained from the first and second time points and the speed result from the second and third time points. Images of LIPC 110 captured by camera 202 at any number of additional time points may be used to further refine this averaging technique. Alternatively, a known offset of camera 202 from laser 102 is used to determine a position of LIPC 110 with respect to camera 202 at the time laser 102 fires ($t_0$), camera 202 captures a single image at a known time $t_1$ after laser 102 fires, and processor 112 detects the displacement in the single image from the known original position and computes the airspeed by dividing by the time interval ($\Delta t = t_1 - t_0$).

Additionally or alternatively, camera 202 is used to determine an air density of air 108 as the air data. More specifically, the brightness or intensity of LIPC 110 correlates to an air density of air 108. Thus, in some examples, camera 202 is configured to detect an intensity of LIPC 110 in the at least one image (captured at, e.g., any of $t_1$, $t_2$, and $t_3$), and processor 112 is configured to compute an air density of the air outside the aircraft based on the detected intensity. In some examples, intensity-to-density calibration data, relating detected intensity to the air density of air 108, is stored in memory 114 and used by processor 112 to convert the detected intensity value to a density value. The intensity-to-density calibration data may be obtained empirically at various air densities for each combination of laser type, laser tuning (e.g., frequency/energy settings of laser 102), time interval between induction of LIPC 110 and image capture, and camera type. In certain examples, processor 112 calculates the air density by averaging the results obtained from multiple camera images.

Figure 3:
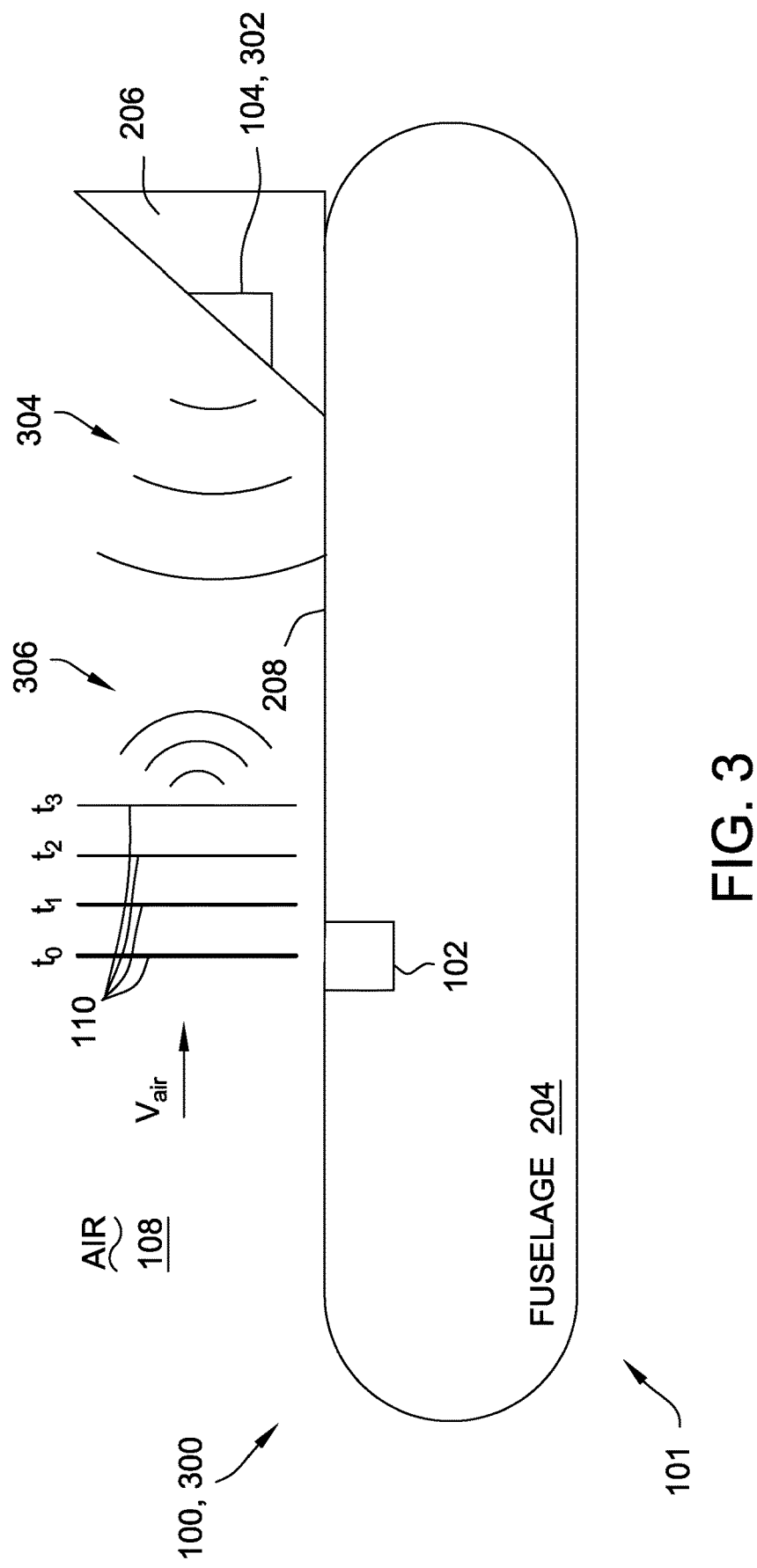
FIG. 3 is a schematic side elevation view of an aircraft including another implementation of the air data system of FIG. 1.

FIG. 3 is a schematic side elevation view of aircraft 101 showing another example implementation 300 of air data system 100. In implementation 300, sensor system 104 includes a radar 302 disposed on aircraft 101. Laser 102 is substantially as described above with respect to implementation 200.

As described above, LIPC 110 induced by laser light emitted from laser 102 conducts electricity and therefore is capable of reflecting radar waves emitted from radar 302. In implementation 300, radar 302 is positioned with respect to laser 102 such that the emitted laser light is generally tangent to a wavefront of radio waves 304 emitted from radar 302, which facilitates reflection of emitted, or "first," radio waves 304 from LIPC 110 as reflected, or "second," radio waves 306. In the illustrated example, laser 102 is positioned within fuselage 204 and oriented to emit laser light upward, and radar 302 is positioned on vertical stabilizer 206 and oriented to face LIPC 110 as aircraft 101 travels beneath LIPC 110, such that the emitted laser light is tangent to the wavefront of radio waves 304 emitted from radar 302. Moreover, in some examples including the illustrated example, radar 302 is positioned such that a direction of radar incidence and reflection is generally aligned with the airflow velocity vector $V_{air}$, which reduces geometric corrections needed to convert detected Doppler shift or pulse-return travel time to airspeed. Alternatively, radar 302 is positioned at any suitable location on aircraft 101 relative to laser 102, such as a wing (not shown) or fuselage 204 of aircraft 101, and is oriented in any suitable direction to detect LIPC 110 during the short time window it remains visible after being induced.

In operation, air 108 flows past aircraft 101 at speed $V_{air}$. Processor 112 transmits a signal to laser 102 that causes laser 102 to fire a pulse at time $t_0$, creating LIPC 110 in air 108 flowing past aircraft 101. LIPC 110 contains a large population of ions and free electrons. For at least a few milliseconds, it glows brightly and also conducts electricity, sufficient to reflect radio waves, while moving with the airstream to subsequent positions relative to aircraft 101, illustrated at times $t_1$, $t_2$, and $t_3$. The narrowing of the lines used to illustrate LIPC 110 at subsequent times illustrates a gradual fade over time of an electrical conductivity of LIPC 110.

The electrical conductivity of LIPC 110 enables it to be tracked by camera 202. Processor 112 transmits a signal to radar 302 that causes radar 302 to emit first radio waves 304 in pulses at at least one known time after $t_0$, for example, at times $t_1$, $t_2$, and $t_3$. First radio waves 304 for each pulse reflect from LIPC 110 as second radio waves 306. Radar 302 detects the returning second radio waves 306 and sends the detection data to computing device 106. Processor 112 of computing device 106 calculates the airspeed at the times corresponding to each radar pulse using known radar signal processing techniques. For example, processor 112 uses a Doppler shift of second radio waves 306 relative to first radio waves 304 to calculate the speed at which LIPC 110 is moving relative to radar 302. Additionally or alternatively, processor 112 locates LIPC 110 at the time of each radar pulse using radar pulse return time (e.g., time from emission of first radio waves 304 until return of second radio waves 306) to estimate the displacement of LIPC 110 over a known time interval and, therefore, the speed at which LIPC 110 is moving. In some examples, processor 112 uses both techniques. This speed is airspeed $V_{air}$, of aircraft 101. Alternatively, processor 112 uses any suitable technique to derive $V_{air}$, from the detected radar signals.

In some examples, using the pulse-return technique, processor 112 detects a first displacement of LIPC 110 between a first pulse of radar 302 at a first time point (e.g., $t_1$) and a second pulse of radar 302 at a second time point (e.g., $t_2$) and computes the airspeed by dividing the first displacement by the time interval between the first and second time points (e.g., $\Delta t = t_2 - t_1$). In other examples, the airspeed is calculated by averaging the results from a number of time intervals. For example, processor 112 further detects a second displacement of LIPC 110 between a third pulse of radar 302 at a third time point (e.g., $t_3$) and the second pulse of radar 302 at the second time point, divides the second displacement by the time interval between the second and third time points, and computes the airspeed by averaging the speed result obtained from the first and second time points and the speed result from the second and third time points. Positions of LIPC 110 detected by radar 302 at any number of additional time points may be used to further refine this averaging technique. Alternatively, a known offset of radar 302 from laser 102 is used to determine a position of LIPC 110 with respect to radar 302 at the time laser 102 fires ($t_0$), radar 302 pulses a single time at a known time $t_1$ after laser 102 fires, and processor 112 detects the displacement at the single pulse time from the known original position and computes the airspeed by dividing by the time interval ($\Delta t = t_1 - t_0$).

Similarly, in some examples, using the Doppler shift technique, radar 302 pulses a single time at a known time $t_1$ after laser 102 fires, and processor 112 detects the Doppler shift in second radio waves 306 from the single pulse time and computes the airspeed based on the Doppler shift. Alternatively, processor 112 averages the speed result obtained from the detected Doppler shift for radar pulses at a plurality of time points.

Additionally or alternatively, radar 302 is used to determine an air density of air 108 as the air data. More specifically, the radio-wave reflectivity of LIPC 110 correlates to an air density of air 108. Thus, in some examples, radar 302 is configured to detect an intensity of second radio waves 306 in the detection data (captured at, e.g., any of $t_1$, $t_2$, and $t_3$), and processor 112 is configured to compute an air density of the air outside the aircraft based on the detected intensity. In some examples, intensity-to-density calibration data, relating detected intensity to the air density of air 108, is stored in memory 114 and used by processor 112 to convert the detected intensity value to a density value. The intensity-to-density calibration data may be obtained empirically at various air densities for each combination of laser type, laser tuning (e.g., frequency/energy settings of laser 102), time interval between induction of LIPC 110 and radar data capture, and radar type and tuning (e.g., frequency/energy settings of radar 302). In certain examples, processor 112 calculates the air density by averaging the results obtained from multiple radar pulses.

Because the distance that radio waves 304 and 306 need to travel is relatively small, in some examples radar 302 is operable with a relatively short range or low power. Thus, radar 302 may be implemented using relatively small, lightweight, and/or inexpensive hardware.

As discussed above, the frequency of sensor system 104 and laser 102 need not overlap. In other words, in some examples, laser 102 is configured to emit the laser light within a first frequency range, and sensor system 104 is configured to sense the at least one property of LIPC 110 by detecting emissions from LIPC 110 within a second frequency range that is non-overlapping with the first frequency range. Thus, unlike LIDAR, where the laser and the sensor system use the same frequency or frequency range for emitting and detecting the reflected laser light, the frequency of the laser light emitted by laser 102 is independent from the frequency of radiation emitted from LIPC 110 (and independent from the frequency employed by radar 302). Moreover, in some examples, the combination of laser 102 and sensor system 104 is selected to reduce or eliminate a sensitivity of the air data measurements to environmental effects, such as icing and/or shock wave/heating. Thus, air data system 100 is capable of functioning in environmental conditions (e.g., ice, hypersonic flight) where conventional pitot tube systems are potentially degraded, and is suitable as a primary air data system or as a back-up to a conventional pitot tube system.

Figure 4:
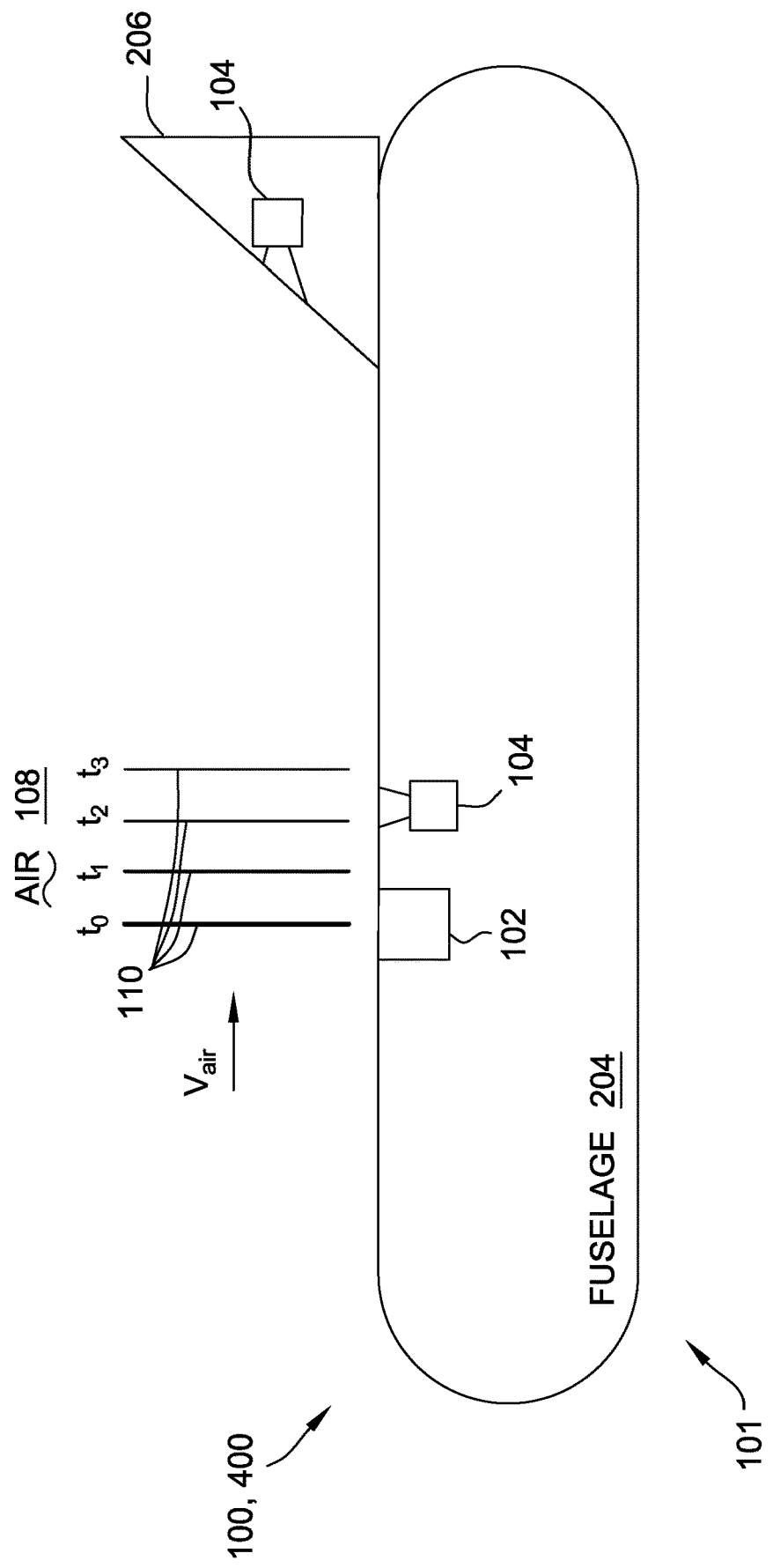
FIG. 4 is a schematic side elevation view of an aircraft including another implementation of the air data system of FIG. 1.

FIG. 4 is a schematic side elevation view of aircraft 101 showing another example implementation 400 of air data system 100. Implementation 400 includes a plurality of sensor systems 104 disposed on aircraft 101. Although the plurality of sensor systems 104 is illustrated as two sensor systems 104, alternatively the plurality of sensor systems 104 includes any suitable number of sensor systems 104. For example, each of the plurality of sensor systems 104 includes at least one of camera 202 or radar 302.

Sensor systems 104 are offset, i.e., spaced apart from each other, on aircraft 101 and each positioned to detect signals from the same LIPC 110. In the illustrated example, a first sensor system 104 is positioned on fuselage 204 aft of laser 102 and oriented upwards to view LIPC 110 as aircraft 101 travels beneath LIPC 110, and a second sensor system 104 is positioned on vertical stabilizer 206 and oriented to face LIPC 110 as aircraft 101 travels beneath LIPC 110. Additionally or alternatively, each of the plurality of sensor systems 104 is positioned at any suitable location on aircraft 101 that enables air data system 100 to function as described herein. For example, one of the plurality of sensor systems 104 is positioned on or adjacent to wing tip 212 (shown in FIG. 2B) of aircraft 101.

In operation, processor 112 is programmed to cause the plurality of sensor systems 104 to capture data from LIPC 110 simultaneously at at least one known time after laser 102 pulses to create LIPC 110. In some examples, the simultaneously measured positions of LIPC 110 relative to each sensor system 104, in combination with the known offset between sensor systems 104 on aircraft 101, facilitates calculation of a 3-D state of aircraft 101. Any suitable known geometric algorithm may be used to calculate suitable parameters of the 3-D state of aircraft 101.

Figure 5A:
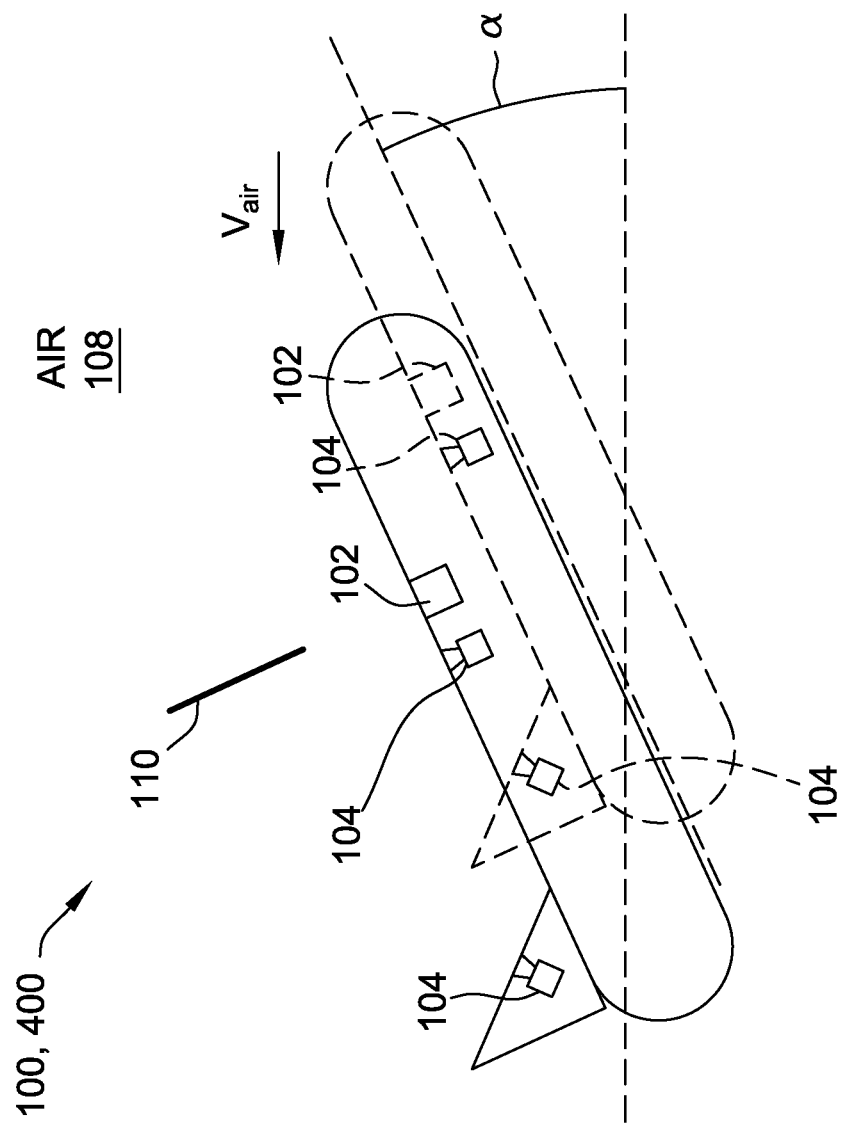
FIG. 5A is a schematic diagram showing the air data system shown in FIG. 4 being used to measure the angle of attack of the aircraft.

For example, FIG. 5A is a schematic diagram showing air data system 100 being used to measure an angle of attack a of aircraft 101. More specifically, aircraft 101 is illustrated in solid lines at time $t_0$, when laser 102 is caused to emit laser light to create LIPC 110, and in dashed lines at a later time $t_1$, when sensor systems 104 are caused to collect data. LIPC 110 is stationary relative to air 108, and thus aircraft 101 has traveled beneath LIPC 110 at time $t_1$. Processor 112 is programmed to calculate angle of attack a from the simultaneously measured positions of LIPC 110 relative to each sensor system 104, in combination with the known offset between sensor systems 104.

Figure 5B:
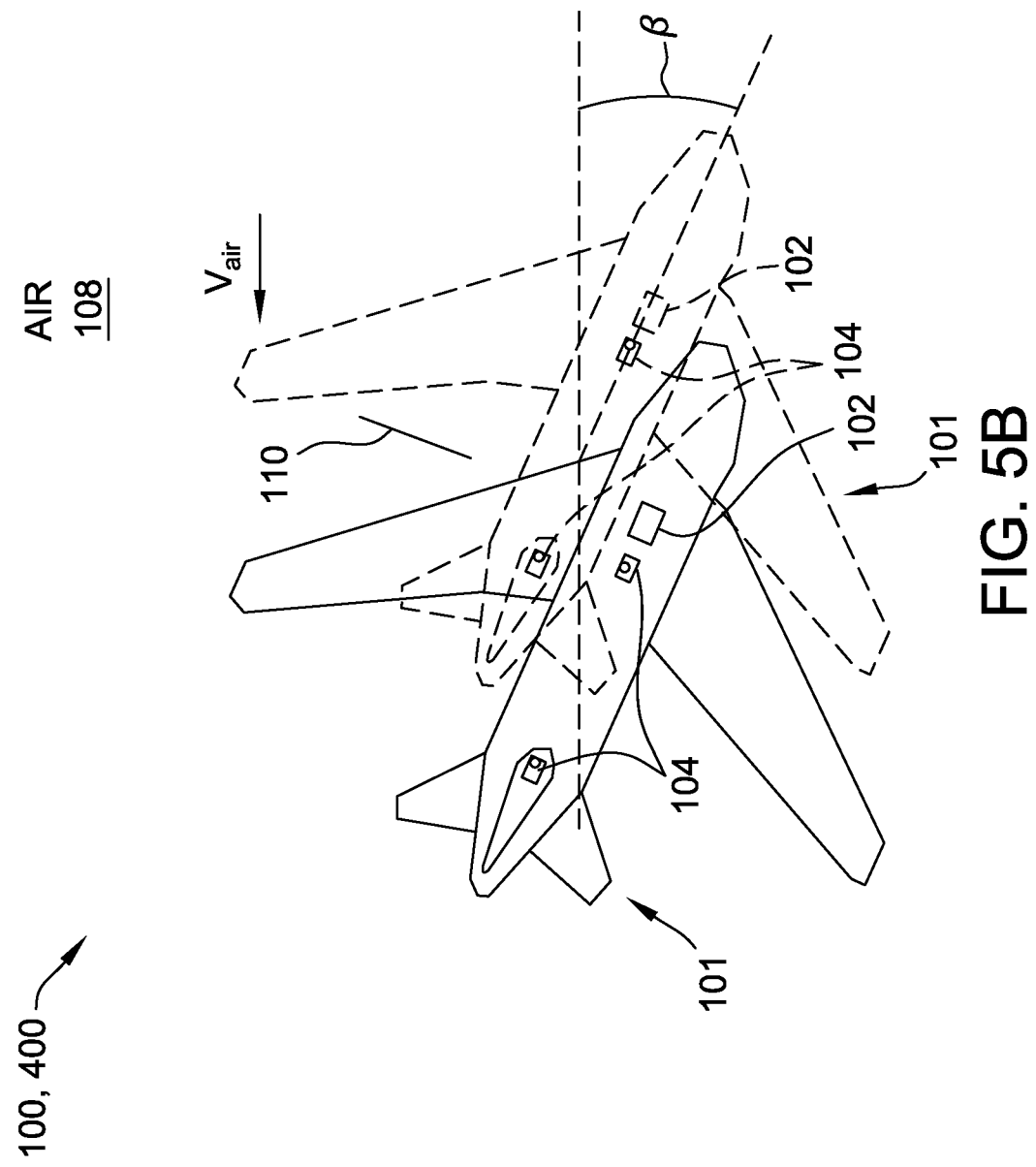
FIG. 5B is a schematic diagram showing the air data system shown in FIG. 4 being used to measure the angle of side slip of the aircraft.

For another example, FIG. 5B is a schematic diagram showing air data system 100 being used to measure an angle of sideslip 13 of aircraft 101. More specifically, aircraft 101 is illustrated in solid lines at time $t_0$, when laser 102 is caused to emit laser light to create LIPC 110, and in dashed lines at a later time $t_1$, when sensor systems 104 are caused to collect data. Although LIPC 110 would be created as a vertical column directly above aircraft 101 based on the example placement of laser 102, LIPC 110 is illustrated as offset laterally from aircraft 101 for ease of explanation. LIPC 110 is stationary relative to air 108, and thus aircraft 101 has traveled beneath LIPC 110 at time $t_1$. Processor 112 is programmed to calculate angle of sideslip 13 from the simultaneously measured positions of LIPC 110 relative to each sensor system 104, in combination with the known offset between sensor systems 104.

In some examples, air data system 100 is implemented on aircraft 101 implemented as a rotorcraft. Measuring air data, such as airspeed, of a rotorcraft is difficult using conventional air data systems on aircraft 101 because rotorcraft create a downwash zone, in which local air velocity is deflected in complex ways by rotor blades of the rotorcraft. The speed of air in the rotor downwash zone is therefore different from the speed of air outside the zone, which is the airspeed of the rotorcraft sought to be measured. In some examples in which aircraft 101 is a rotorcraft, laser 102 is configured to emit laser light beyond the downwash zone of the rotorcraft and induce LIPC 110 outside the downwash zone. Sensor system 104 is configured to sense at least one property of LIPC 110 outside the downwash zone, as described above, and computing device 106 is configured to compute air data of the rotorcraft, based on the detected properties of LIPC 110, as described above.

Figure 6:
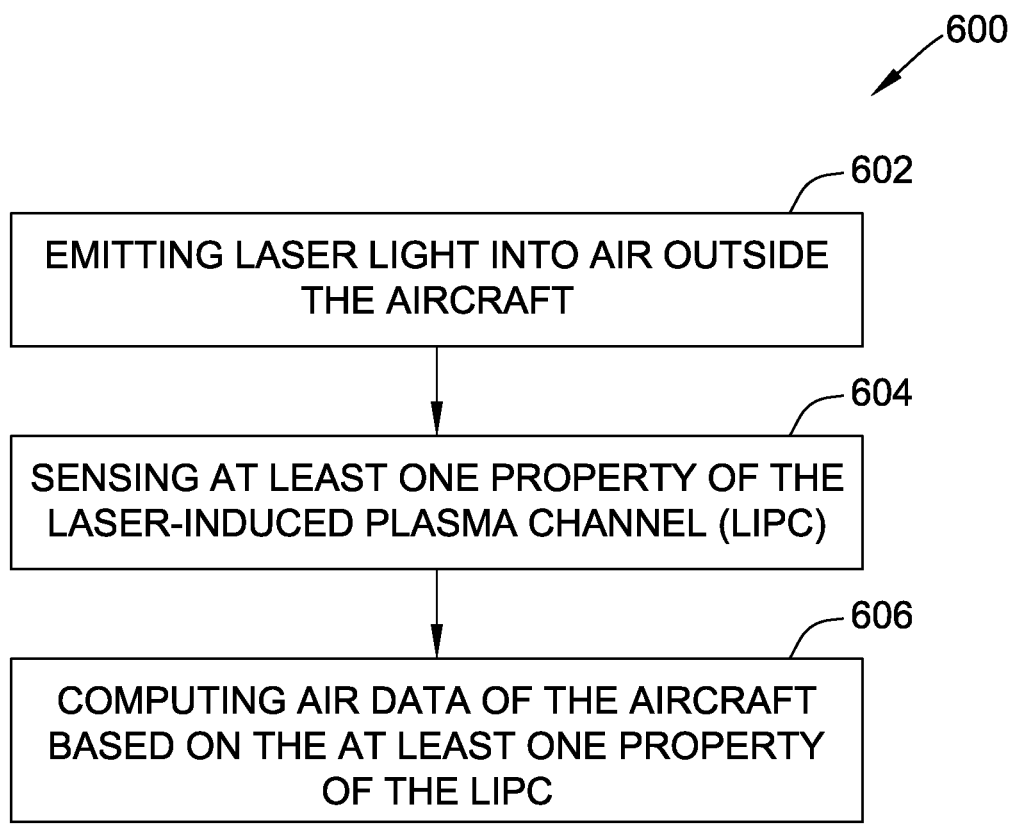
FIG. 6 is a flow diagram of an example method of measuring air data of an aircraft.

FIG. 6 is a flow diagram of an example method 600 of measuring air data of aircraft 101. Method 600 includes emitting 602, by a laser, such as laser 102, disposed on the aircraft, laser light into air outside the aircraft. The laser is tuned to induce a LIPC in the air. Method 600 further includes sensing 604, by a sensor system, such as sensor system 104, disposed on the aircraft, at least one property of the LIPC. Method 600 also includes computing 606, by a computing device disposed on the aircraft, such as computing device 106, the air data of the aircraft based on the properties of the LIPC. Additionally or alternatively, method 600 includes other steps consistent with the descriptions of air data system 100 above.

Example technical effects of the methods, systems, and apparatus described herein include at least one of: (a) an air data system with increased reliability under a wide range of environmental conditions, such as but not limited to icing or hypersonic flight; (b) a laser-based air data system that is operable using a relatively short-range, low power laser as compared to conventional laser-based air data systems; (c) an air data system that measures a 3-D orientation of the aircraft, such as angle of attack and/or sideslip; (d) an air data system for which no components "stick out" in the airstream or protrude from the aircraft, thus reducing a risk of damage during ground operations; and (e) an air data system operable to measure air data outside a downwash zone of a rotor craft.

The systems and methods described herein are not limited to the specific examples described herein, but rather, components of the systems and/or steps of the methods may be utilized independently and separately from other components and/or steps described herein. As one example, air data system 100 may be implemented on a ground-based vehicle. As another example, air data system 100 may be implemented in a wind tunnel. More specifically, laser 102 and sensor system 104 are positioned relative to the wind tunnel, with computing device 106 communicating with laser 102 and sensor system 104. Air data system 100 is used to measure a flow field in the wind tunnel.

As used herein, an element or step recited in the singular and proceeded with the word "a" or "an" should be understood as not excluding plural elements or steps unless such exclusion is explicitly recited. Furthermore, references to "one example" of the present disclosure, "an example," or "some examples" are not intended to be interpreted as excluding the existence of additional examples that also incorporate the recited features.

This written description uses examples to disclose various examples, which include the best mode, to enable any person skilled in the art to practice those examples, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of measuring air data of an aircraft, the method comprising:
    emitting, by a laser disposed on the aircraft, laser light toward a beam trap disposed on the aircraft, the beam trap configured to absorb the laser light, wherein the laser is tuned to induce a laser-induced plasma channel (LIPC) in air outside the aircraft between the laser and the beam trap;
    sensing, by a sensor system disposed on the aircraft, an intensity of the LIPC, wherein the sensor system comprises at least one of a camera and a radar; and
    computing, by a computing device disposed on the aircraft, the air data of the aircraft based on the at least one property of the LIPC, wherein said computing comprises computing an air density of air outside the aircraft, wherein said computing the air density comprises applying, by the computing device, intensity-to-density calibration data to the detected intensity to obtain the air density, and wherein the intensity-to-density calibration data corresponds to a tuning of the laser.

2. The method of claim 1, wherein said computing the air data comprises computing, by the computing device, an airspeed of the aircraft.

3. The method of claim 1, wherein the sensor system comprises a camera, and wherein said sensing the at least one property comprises capturing, using the camera, at least one image of the LIPC.

4. The method of claim 3, wherein:
    said capturing the at least one image comprises capturing a first image of the LIPC at a first time point and capturing a second image of the LIPC at a second time point; and
    said computing the air data comprises detecting, by the computing device, a displacement of the LIPC from the first image to the second image, and computing, by the computing device, an airspeed of the aircraft based on the displacement.

5. The method of claim 3, wherein:
    said sensing the at least one property comprises detecting an intensity of the LIPC in the at least one image; and
    said computing the air data comprises computing an air density of air outside the aircraft based on the intensity.

6. The method of claim 1, wherein said emitting the laser light comprises emitting the laser light within a first frequency range, and wherein said sensing the at least one property of the LIPC comprises detecting emissions from the LIPC within a second frequency range that is non-overlapping with the first frequency range.

7. The method of claim 1, wherein:
    the sensor system comprises a first sensor disposed at a first location on the aircraft and a second sensor disposed at a second location on the aircraft, wherein the second location is offset from the first location;
    said sensing the at least one property of the LIPC comprises sensing a respective position of the LIPC relative to each of the first sensor and the second sensor; and
    the method further comprises estimating, by the computing device, a three-dimensional state of the aircraft based on the respective position and the offset.

8. A method of measuring air data of an aircraft, the method comprising:
    emitting, by a laser disposed on the aircraft, laser light into air outside the aircraft, wherein the laser is tuned to induce a laser-induced plasma channel (LIPC) in the air;
    sensing, by a sensor system disposed on the aircraft, at least one property of the LIPC, comprising:
        capturing, using a camera disposed on the aircraft, at least one image of the LIPC; and
        detecting an intensity of the LIPC in the at least one image; and
    computing, by a computing device disposed on the aircraft, the air data of the aircraft based on the at least one property of the LIPC, comprising computing an air density of air outside the aircraft, wherein said computing the air density comprises applying, by the computing device, intensity-to-density calibration data to the detected intensity to obtain the air density, and wherein the intensity-to-density calibration data corresponds to a tuning of the laser.

9. A method of measuring air data of an aircraft, the method comprising:

emitting, by a laser disposed on the aircraft, laser light into air outside the aircraft, wherein the laser is tuned to induce a laser-induced plasma channel (LIPC) in the air;

sensing, by a sensor system disposed on the aircraft, at least one property of the LIPC; and computing, by a computing device disposed on the aircraft, the air data of the aircraft based on the at least one property of the LIPC, wherein the sensor system comprises a radar, and wherein said sensing the at least one property of the LIPC comprises emitting, by the radar, first radio waves toward the LIPC, and receiving, by the radar, second radio waves comprising at least a portion of the first radio waves reflected by the LIPC.

10. The method of claim 9, wherein said emitting the laser light comprises emitting the laser light toward a beam trap disposed on the aircraft, and wherein the beam trap is configured to absorb the laser light.

11. The method of claim 9, wherein said computing the air data comprises:

detecting, by the computing device, at least one of a Doppler shift of the second radio waves or a pulse return time of the second radio waves; and computing an airspeed of the aircraft based on the at least one of the Doppler shift or the pulse return time.

12. The method of claim 9, wherein:

said sensing the at least one property comprises detecting an intensity of the second radio waves; and said computing the air data comprises computing an air density of air outside the aircraft based on the intensity of the second radio waves.

13. The method of claim 12, wherein said computing the air density comprises applying, by the computing device, intensity-to-density calibration data to the detected intensity to obtain the air density, wherein the intensity-to-density calibration data corresponds to a tuning of the laser and a tuning of the radar.

14. An air data system for measuring air data of an aircraft, the system comprising:

a laser disposed on the aircraft;

a beam trap disposed on the aircraft and configured to absorb the laser light emitted from the laser;

a sensor system disposed on the aircraft, wherein the sensor system comprises at least one of a camera and a radar; and a computing device disposed on the aircraft and comprising at least one processor in electronic communication with the laser and the sensor system, wherein the at least one processor is configured to:

cause the laser to emit laser light into air outside the aircraft between the laser and the beam trap, wherein the laser is tuned to induce a laser-induced plasma channel (LIPC) in the air;

receive, from the sensor system, at least one property of the LIPC detected by the sensor system; and compute the air data of the aircraft based on the at least one property of the LIPC, wherein said computing comprises computing an air density of air outside the aircraft, wherein said computing the air density comprises applying, by the computing device, intensity-to-density calibration data to the detected intensity to obtain the air density, and wherein the intensity-to-density calibration data corresponds to a tuning of the laser.

15. The air data system of claim 14, wherein the aircraft is a rotorcraft, and wherein the laser is configured to induce the LIPC within a zone of air outside a rotor downwash zone of the rotorcraft.

16. The air data system of claim 14, wherein the sensor system comprises a first sensor disposed at a first location on the aircraft and a second sensor disposed at a second location on the aircraft, wherein the second location is offset from the first location, and wherein the at least one processor is further configured to:

cause the sensor system to sense a respective position of the LIPC relative to each of the first sensor and the second sensor; and estimate a three-dimensional state of the aircraft based on the respective position and the offset.

17. The air data system of claim 14, wherein the sensor system comprises a camera, and wherein the at least one property comprises at least one image of the LIPC captured using the camera.

18. The air data system of claim 17, wherein the at least one processor is further configured to:

cause the camera to capture a first image of the LIPC at a first time point and capture a second image of the LIPC at a second time point;

detect a displacement of the LIPC from the first image to the second image; and compute an airspeed of the aircraft based on the displacement.

19. The air data system of claim 14, wherein the laser is tuned to emit the laser light within a first frequency range, and wherein the sensor system is configured to detect emissions from the LIPC within a second frequency range that is non-overlapping with the first frequency range.

20. An air data system for measuring air data of an aircraft, the system comprising:

a laser disposed on the aircraft;

a sensor system disposed on the aircraft and comprising a camera; and a computing device disposed on the aircraft and comprising at least one processor in electronic communication with the laser and the sensor system, wherein the at least one processor is configured to:

cause the laser to emit laser light into air outside the aircraft, wherein the laser is tuned to induce a laser-induced plasma channel (LIPC) in the air;

receive, from the sensor system, at least one property of the LIPC detected by the sensor system, wherein the at least one property includes at least one image of the LIPC captured using the camera; and compute the air data of the aircraft based on the at least one property of the LIPC, wherein the camera is configured to detect an intensity of the LIPC in the at least one image, wherein the at least one processor is further configured to compute an air density of air outside the aircraft based on the intensity by applying intensity-to-density calibration data to the detected intensity to obtain the air density, and wherein the intensity-to-density calibration data corresponds to a tuning of the laser.

21. An air data system for measuring air data of an aircraft, the system comprising:

a laser disposed on the aircraft;

a sensor system disposed on the aircraft; and a computing device disposed on the aircraft and comprising at least one processor in electronic communication with the laser and the sensor system, wherein the at least one processor is configured to:

cause the laser to emit laser light into air outside the aircraft, wherein the laser is tuned to induce a laser-induced plasma channel (LIPC) in the air;

receive, from the sensor system, at least one property of the LIPC detected by the sensor system; and compute the air data of the aircraft based on the at least one property of the LIPC, wherein the sensor system comprises a radar configured to emit first radio waves toward the LIPC induced by the laser and receive second radio waves comprising at least a portion of the first radio waves reflected by the LIPC.

22. The air data system of claim 21, further comprising a beam trap disposed on the aircraft and configured to absorb the laser light emitted from the laser.

23. The air data system of claim 21, wherein the at least one processor is further configured to:

detect at least one of a Doppler shift of the second radio waves or a pulse return time of the second radio waves; and compute an airspeed of the aircraft based on the at least one of the Doppler shift or the pulse return time.

24. The air data system of claim 21, wherein the radar is further configured to detect an intensity of the second radio waves, and wherein the at least one processor is further configured to compute an air density of air outside the aircraft based on the intensity of the second radio waves.

25. The air data system of claim 24, wherein the at least one processor is further configured to apply intensity-to-density calibration data to the detected intensity to obtain the air density, and wherein the intensity-to-density calibration data corresponds to a tuning of the laser and a tuning of the radar.

* * * * *